(12) United States Patent
Vatalaro et al.

(10) Patent No.: US 6,336,041 B1
(45) Date of Patent: Jan. 1, 2002

(54) SYSTEM FOR EQUALIZATION AND PRECOMPENSATION FOR TDMA COMMUNICATIONS

(75) Inventors: Francesco Vatalaro; Franco Mazzenga, both of Rome (IT)

(73) Assignee: Uni.Com S.p.A., Aversa (IT)

( * ) Notice: Subject to any disclaimer, the term of this patent is extended or adjusted under 35 U.S.C. 154(b) by 0 days.

(21) Appl. No.: 09/297,972

(22) PCT Filed: Oct. 17, 1997

(86) PCT No.: PCT/IT97/00255

§ 371 Date: May 12, 1999

§ 102(e) Date: May 12, 1999

(87) PCT Pub. No.: WO99/16220

PCT Pub. Date: Apr. 1, 1999

(30) Foreign Application Priority Data

Sep. 19, 1997 (IT) ............................................. RM97A0563

(51) Int. Cl.[7] .............................. H04B 1/38; H04M 1/00
(52) U.S. Cl. ........................... 455/561; 455/424; 375/229
(58) Field of Search ................................... 455/561, 422, 455/560, 452, 424, 450; 370/310, 336, 337, 347; 375/367, 229, 350

(56) References Cited

U.S. PATENT DOCUMENTS

| | | | |
|---|---|---|---|
| 4,771,448 A | * 9/1988 | Koohgoli et al. | 379/60 |
| 5,652,772 A | * 7/1997 | Isaksson et al. | 375/367 |
| 5,828,658 A | * 10/1998 | Ottersten et al. | 370/310 |
| 6,078,817 A | * 6/2000 | Rahman | 455/452 |

FOREIGN PATENT DOCUMENTS

| | | |
|---|---|---|
| EP | 0411463 A | 2/1991 |
| EP | 0415502 A | 3/1991 |
| EP | 0593186 A | 4/1994 |
| GB | 2262866 A | 6/1993 |

OTHER PUBLICATIONS

Fuhl, J. et al., "Adaptive Equalisation for DECT Systems Operating in Low Time–Dispersive Channels," *Electronics Letters*, vol. 29, No. 24, Nov. 25, 1993, pp. 2076–2077, XP000423754.

* cited by examiner

*Primary Examiner*—Dwayne Bost
*Assistant Examiner*—L West
(74) *Attorney, Agent, or Firm*—Smith, Gambrell & Russell, LLP

(57) ABSTRACT

It is proposed an equalization and precompensation system for TDMA communication and its application to the DECT system, which is able to enlarge the coverage area provided by a single base station in a wireless system through electronic procesing performed at the base station only, and to enhance the transmission quality of a wireless system through electronic processing performed at the base station only, in addition or in alternative to the coverage area enlargement of the individual base station, comprising a processor (P) inserted in the base station only, and replacing the direct links commomnly used to connect the modulation (MO) and the demodulation (DEM) sections respectively with the transmitting and receiving sections and containing channel estimation subsystems (CES), equalization (EQS) and precompensation (PCS) subsystems in order to be effective both for uplink and downlink.

8 Claims, 3 Drawing Sheets

SYSTEM FOR EQUALIZATION AND PRECOMPENSATION FOR TDMA COMMUNICATIONS

The invention concerns an equalization and a precompensation system for time division multiple access (TDMA) communications and its application to DECT (Digital Enhanced Cordless Telecommunications). The DECT system was conceived as a radio port interface to existing, and future, telecommunication networks, both fixed and mobile. Originally, the DECT system was conceived to be used within indoor environments, although its extension to outdoor environments has been recently proposed. However, the characteristics of outdoor multipath propagation are deeply different from those considered in the DECT standard. In particular, a non frequency selective channel was assumed as a basis for the original system design and therefore no equalization subsystems are used neither in the DECT base station (BS) nor in the user terminal, named mobile station (MS) in the context of DECT. In this scenario, to counteract the effects of multipath propagation, which are particularly severe outdoor, many base stations are located at a minimum distance ranging from 50 to 100 m, so reducing the delay spread and increasing the coherence bandwidth. The need for a very large number of DECT base stations to achieve a satisfactory performance in outdoor environments was evidenced early in the state of art, but the extremely large number of base stations which may be necessary to suitably cover a relatively large urban or suburban area leads to a huge initial network deployment cost that the service provider must afford. This is in contrast with the well-known concept of "cell splitting", introduced with cellular systems in which the size of each elementary coverage area is tailored to the traffic demand so allowing a gradual deployment of the network, reducing the investment risk and allowing expenditures better matched to revenues. In order to reduce the number of necessary base stations it is mandatory to enlarge the area of the cell served by each BS. In this case, to offer a suitable quality of service, equalization techniques must be adopted both in the uplink (MS-to-BS) and in the downlink (BS-to-MS).

In principle, one of the two following approaches may be followed:
1. to add a suitable equalization technique to the DECT standard in order to improve the performance of a possible second generation of portable terminals; to ensure the compatibility with the present first generation terminals it is necessary for such a technique to be "transparent", i.e. to provide unaffected performance to existing terminals;
2. to add a "proprietary" equalization technique not influencing the architecture of the user terminals, i.e. able to provide performance improvements to all DECT terminals, including those of the present generation already on the market.

Evidently, the approach described in the last point is most advantageous because performance is improved even for existing DECT terminals, while full compatibility is preserved with both present and future terminals designed in accordance with the DECT standard. It requires that the necessary modifications to the overall transmission system pertain to base stations only. It is the main objective of the present invention to provide an architecture for the base station based on equalization and precompensation means without influencing the structure of the DECT user terminal such as to ensure significant performance improvements both in the uplink and in the downlink transmissions.

Therefore the invention pertains to wireless communications, and more particularly it introduces a BS architecture which is able to provide equalization to DECT links, especially useful to those operating in outdoor environments. The quality levels of both the uplink and the downlink are simultaneously enhanced without putting any requirement to the architecture of the DECT user terminal, which therefore may be generic, i.e. of any vendor, only conditioned on adherence to the DECT standard requirements. Such results are achieved through some functions, to be added to those already performed to meet the DECT standard requirements, which may be implemented with one or more digital signal processing (DSP) special-purpose chips at the BS. Such functions are:

- estimation of the channel impulse response (or, equivalently, the channel transfer function) from the received uplink signal;
- equalization of the received uplink signal before decision;
- time updating and frequency scaling of the estimated channel impulse response (or, equivalently, the channel transfer function);
- precompensation of the downlink signal before transmission, through a suitable subsystem.

The present invention can also be used for other systems employing a TDMA scheme.

A detailed description of the invention is given in the following with the aid of figures and schemes representing an example of the implementation.

Figure 1:
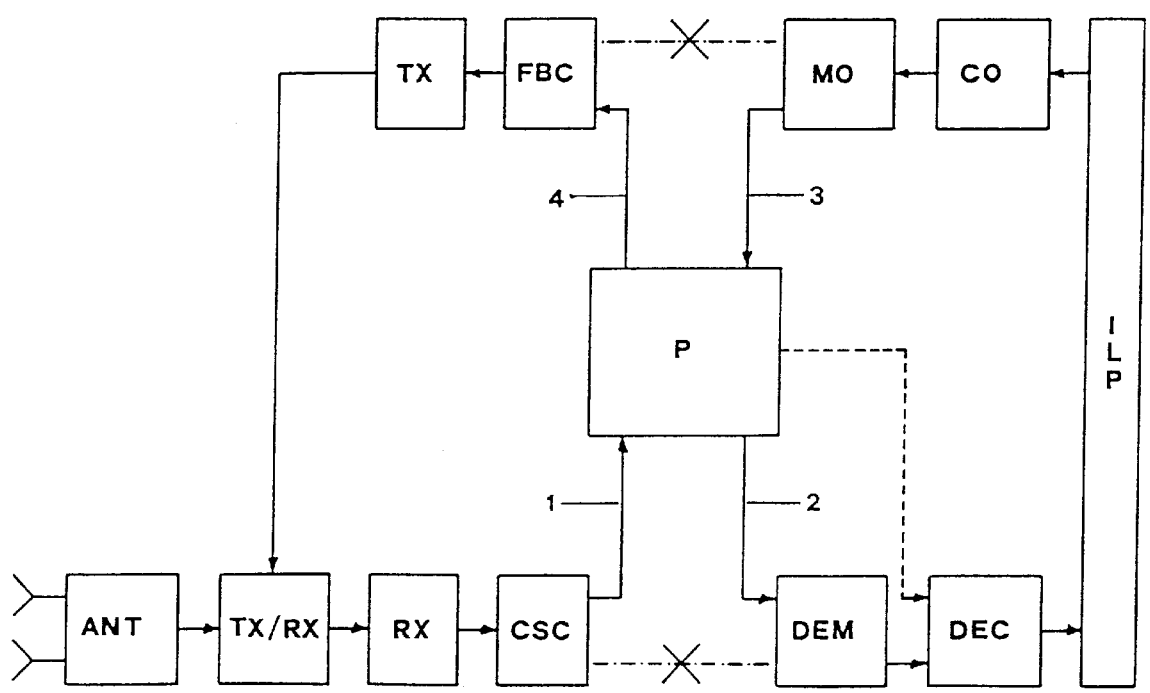
FIG. 1 represents the BS block diagram comprising the processor subject of the invention.
Figure 5:
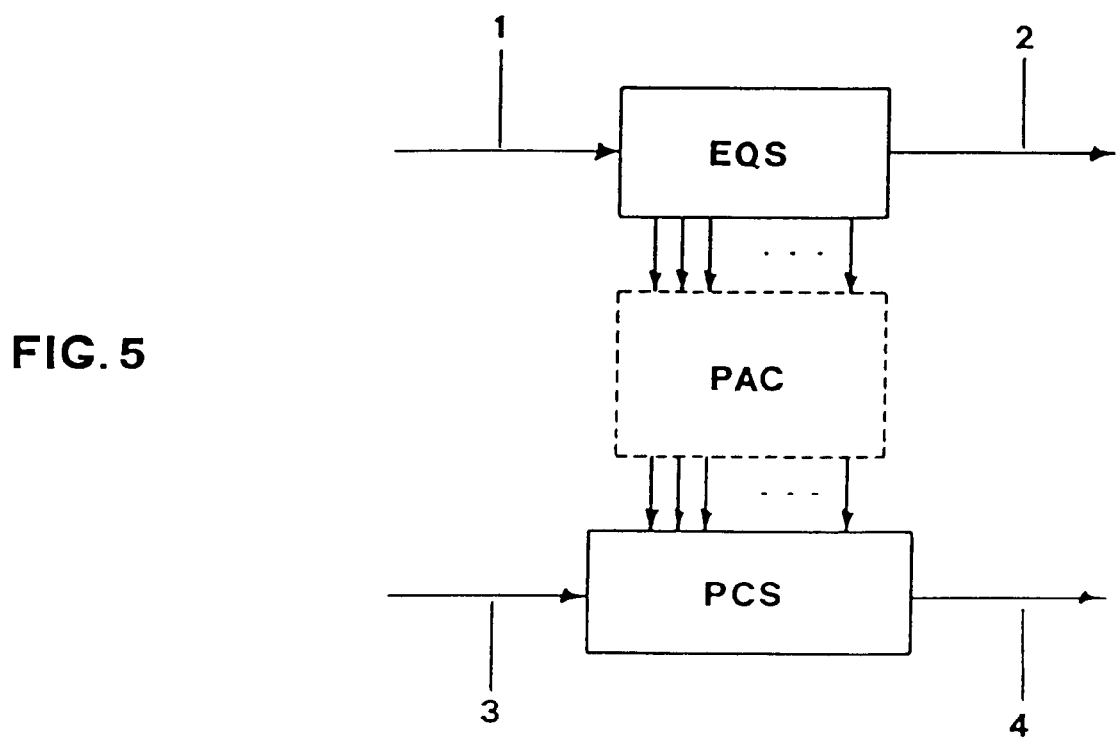

FIG. 5 presents an equivalent scheme of the processor subject of the invention when the equalizer's parameters are directly used to realize the precompensation filter in a digital implementation The figures illustrate a system for equalization and precompensation for TDMA communications, for example for DECT transmissions, where, in a typical BS a processor P has been inserted, to replace the direct links commonly used to connect the modulation and the demodulation sections respectively with the transmitting and receiving sections, so that the architecture of the modified system is obtained considering all the subsystems connected by the solid lines (FIG. 1). The direct links, that must be deleted when processor P in FIG. 1, is used are indicated with the dot-lines and cross symbols.

Referring to FIG. 1, the input to the processor P from the receiving side (1), is the TDMA signal under consideration, which has been received at the antenna subsystem (ANT), and separated from the transmitted signal by means of a diplexer (TX/RX), and processed from a receiver (RX), having among its main goals to downconvert the signal to a suitable intermediate frequency, or directly to baseband, and finally separated from the other TDMA signal by means of a channel selector circuit (CSC). The output of said processor P to the receiving side (2) shows the cascade of the subsystems for demodulation (DEM) and for decision and possible decoding (DEC). It can be connected to the demodulation subsystem (DEM) or, as an alternative, as shown in FIG. 1 with a dotted line, to the decision subsystem (DEC): the choice of the connection is made on the basis of the equalization subsystem that has been implemented in the processor P. The input of the processor P from the transmitting side (3) is the TDMA signal at the output of the modulator (MO) at an intermediate frequency properly selected, possibly pre-processed by a coding circuit (CO). Finally, the output of the processor P from the transmitting side (4), is the input of a frame builder circuit (FBC) where also the signals pertaining to the other users are connected, before the transmission subsystem (TX). The interface logic circuit (ILC) is a generic interface subsystem between the coding-decoding section (CO-DEC), or if the latter is absent, directly between the modulation-demodulation section (MO-DEM) of the BS, with the remaining components used to manage the BS.

According to the possible implementation described in the scheme in FIG. 1 the processor P subject of the invention, operates on the TDMA signal of a single user; equally acceptable is the possible implementation where a single processor is able to operate on the entire TDMA signal, thus including the functions of the subsystem CSC and FBC, or on an arbitrary number of TDMA channels. For conciseness in the scheme in FIG. 1 does not show the synchronization subsystems for timing and carrier recovery, and the links among the various subsystems and the ILC which are necessary to perform control, e.g. by means of a computer.

The scheme shown in FIG. 1, which can be used for a generic TDMA system, is useful for a DECT communication system in order to achieve the previously described advantages in terms of coverage and/or transmission quality.

The multiple access scheme used in the DECT system is based on multicarrier time division multiple access with time division duplex (MC/TDMA/TDD). Ten equally spaced carriers are used, each one carrying a TDMA/TDD signal. They lie in the band starting from 1880 MHz up to 1900 MHz and are equally spaced of 1.728 MHz. The modulation format is Gaussian minimum shift keying (GMSK) with normalized bandwidth BT=0.5, where B is the 3-dB bandwidth and T is the symbol time. The TDMA frame structure of DECT lasts 10 ms and is composed of 11520 bits equally distributed in 24 time slots, and realizing 12 TDD full duplex transmission channels. The first 12 slots in the frame are used for uplink transmissions, while the remaining slots are used for downlink transmissions. Every time slot carries up to 480 bits. The preamble field used for synchronization purposes is composed of 32 bits while another field is used to carry information data. The first 16 bits of the first field are used for slot synchronization while the remaining 16 bits are used for packet synchronization. The bits in the first field can be used to perform the channel estimation function required by the present invention.

Figure 2:
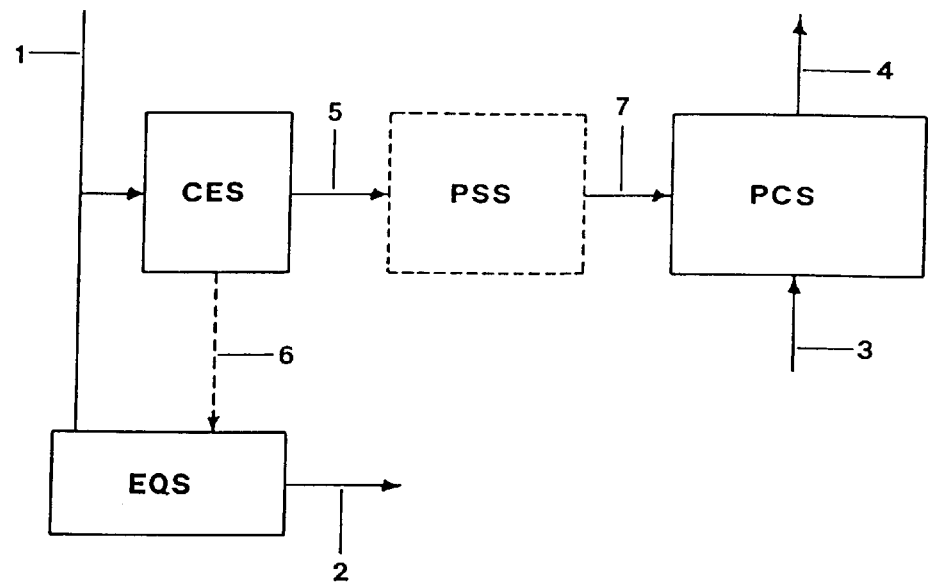
FIG. 2 shows the reference scheme of the processor subject of the invention

Referring to the detailed architecture of the processor P subject of the invention and shown in FIG. 2, since the TDMA technique is assumed, without loss of generality only the processing of a signal which pertains to a single user is described, so that the principle of operation of the base station assembly can be described as follows:

the received uplink signal is used to extract an estimate of the channel impulse response (or, equivalently, of the channel transfer function) by means of a suitable channel estimation subsystem (CES);

equalization of the received uplink waveform is made before decision on the uplink signal by means of a suitable equalization subsystem (EQS);

optionally, the estimated channel impulse response is time updated and frequency scaled before the calculation of the parameters of the precompensation subsystem which acts on the downlink signal; such function is performed by a suitable subsystem for time prediction and frequency scaling (PSS);

the signal to be transmitted in the downlink is distorted on the basis of the channel-state information provided by the CES possibly corrected by the PSS, in order to compensate for the distortions introduced in the channel by means of a suitable precompensation subsystem (PCS);

Also with the adoption of the present invention, in the DECT system the communication is guaranteed in a relatively uniform environment, with low gain antennas both at the BS and at the MS. In particular, this allows to assume that the uplink and downlink propagation conditions are very similar, so that estimate of the downlink channel can be performed on the basis of the measurements for the uplink channel.

Figure 3:
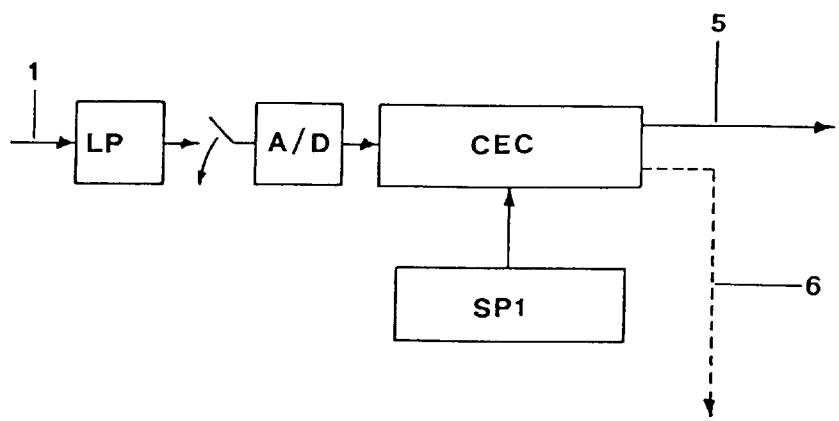
FIG. 3 illustrates a more detailed scheme of the channel estimation subsystem

FIG. 3 illustrates a more detailed scheme of the baseband digital implementation of the channel estimation subsystem which is the simplest implementation.

Obviously other solutions are allowed (at RF or IF or hybrid). In order to reduce the noise effects the received baseband signal at the output of the RF (or IF) stage can be filtered by the low pass filter (LP1) indicated in FIG. 3. Channel estimation, realized by the channel estimation circuit (CEC), can be performed using either analog or digital techniques, or combinations thereof, on the basis of the received preamble. Analog techniques can be based on the cross-correlation between the received signal and a replica of the preamble stored in a suitable register (SP1).

However, the bad correlation properties of the preamble bit sequence do not allow to simply extend identification procedures already in use, e.g. for GSM. In this case digital identification algorithms are preferred where the impulse response is modelled with a finite impulse response (FIR) filter. The parameters of this filter can be calculated in accordance, for example, with the least squares (LS) criterion on the basis of the received preamble. These algorithms are usually implemented at the baseband stage with fast DSP processors and operate on a sampled version of the received signal.

Figure 4:
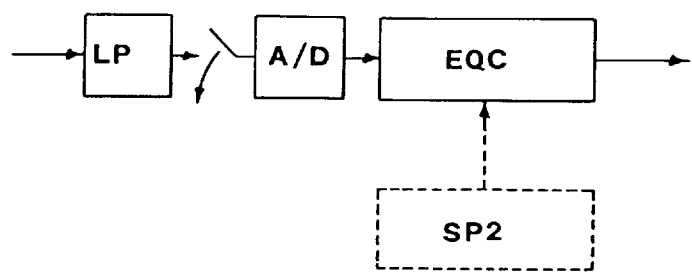
FIG. 4 illustrates the demodulation chain with equalization

To reduce the deleterious effects of multipath propagation on the received signal, equalization must be performed before the decision stage. FIG. 4 shows a more detailed scheme of the demodulation chain with equalization of FIG. 2. The equalization subsystem, generally a filter, is preceeded by a low pass filter (LP2) and an analog to digital (A/D) converter, and can be realized with analog and/or digital techniques, starting from the estimated channel impulse response (or the channel transfer function). As an alternative, it can also be realized using one of the many available adaptive techniques. Among them the simplest architectures are digital and are based on a LS comparison between the samples of the received signal at the output of the receiving filter and the samples of the preamble stored in a suitable register (SP2).

Since the time interval between the measurement of the channel impulse response (or the channel transfer function) and the downlink transmission is of the order of a millisecond, due to the motion of the user terminal it could be necessary to update the estimated channel impulse response before the calculation of the precompensation subsystem parameters. Some linear prediction algorithms based on the minimum mean square error (MMSE) optimization criterion have been proposed. They require the knowledge of the theoretical or experimental channel correlation function, and they can be easily implemented by means of digital techniques. The effectiveness of a prediction stage is related to the maximum allowed speed of the user, $v_{max}$, as well as to the duration of the TDMA frame. In the case of the DECT system, with reference to the half-frame duration, if $v_{max}$=20 km/h and $f_0$=1900 MHz, then the prediction stage may be effective. Moreover frequency scaling of the channel impulse response may be necessary if the carrier used for the downlink signal is different from the carrier used in the uplink.

According to the present invention, precompensation is based on the channel estimate and can be realized according to different strategies, generally through a filter. Basically, the precompensation filter must approximate the inverse of the transmission channel transfer function and for this reason different techniques can be used. For example, if a FIR approximation of the channel impulse response has been achieved, inverse filtering design techniques can be used. Some of them are based on an analysis of the zeros of the z-transform of the estimated channel impulse response. This allows the appropriate calculation of the "inverse channel" impulse response, or the inverse channel transfer function. Significant simplifications in the system realization can be achieved if, as shown in FIG. 5, an equalization system (EQS) is used which is able to reconstruct on the basis of the received preamble the uplink channel waveform before demodulation. In fact, in this case the equalizer's parameters can be directly used to realize the precompensation system (PCS). An optional update of these parameters, by means of suitable time prediction and frequency scaling parameter's adjustment circuit (PAC), could be necessary before the precompensation filter.

Finally also the precompensation delay must be taken into consideration remebering that for DECT a guard interval of about 60 symbols is inserted between two successive packets pertaining to the same frame.

We claim:

1. An equalization and precompensation system for time division multiple access (TDMA) communications and its application to the DECT system, able to enlarge the coverage area provided by a single base station in a wireless system through electronic processing performed at the base station only, and to enhance the transmission quality of a wireless system through electronic processing performed at the base station only, in addition or alternative to the coverage area enlargement of the individual base station, comprising a processor (P) inserted in the base station only, and replacing the direct links commonly used to connect the modulation (MO) and the demodulation (DEM) sections respectively with the transmitting and receiving sections, and whose output through the receiving side, which is composed of the cascade of the demodulation (DEM) and decoding (DEC) subsystems, connected to the demodulator (DEM) or directly to the decoder (DEC), and containing channel estimation subsystems (CES), equalization (EQS) and precompensation (PCS) subsystems in order to be effective both for uplink and downlink.

2. The system according to claim 1, which allows a DECT system to gradually evolve from an initial configuration, characterized by relatively large coverage areas of the individual base stations, to a mature configuration with stations added to meet the increase of traffic demand when and where this arises, with no need of major interventions on already installed stations.

3. The system according to claim 1, wherein said processor (P) performs equalization (EQS) and precompensation (PCS) functions respectively on the uplink and on the downlink of a TDMA system, acting on each single channel, or on the entire TDMA signal, this including the functions of channel selection (CSC) and frame building (FBC), or also on an arbitrary number of TDMA channels.

4. The system according to claim 1, wherein the DECT base station performs electronic processing in the form of estimation of channel impulse response or channel transfer function, or other equivalent function, (CES), equalization (EQS) of the received uplink signal before decision, optionally time updating and frequency scaling (PSS) of the estimated impulse response or equivalent function before the precompensation filter (PCS), which carries out the suitable predistortion of the downlink signal before transmission.

5. The system according to claim 1 further comprising a DECT base station containing an equalization subsystem (EQS) for uplink and of precompensation (PCS) on the downlink, the latter operating on the base of the channel-state information provided by a suitable estimation unit (CES), optionally after action of a time prediction and frequency scaling unit (PSS), and an equalization subsystem (EQS) in the uplink and a precompensation subsystem (PCS) in the downlink, the latter one operating on the basis of the channel state information directly provided by the equalization subsystem (EQS), optionally after action of a time prediction and frequency scaling unit (PAC).

6. The system according to claim 1, further comprising a DECT base station containing an equalization subsystem (EQS) for uplink and of precompensation (PCS) on the downlink, the former operating on the base of the channel-state information provided by a suitable estimation unit (CES), and the latter operating on the basis of the channel-state information provided by a suitable estimation unit (CES) after action of a time production and frequency scaling unit (PSS).

7. The system according to claim 4, wherein the DECT base station contains an equalization subsystem (EQS) for uplink and of precompensation (PCS) on the downlink, the latter operating on the base of the channel-state information provided by a suitable estimation unit (CES), optionally after action of a time prediction and frequency scaling unit (PSS), and an equalization subsystem (EQS) in the uplink and a precompensation subsystem (PCS) in the downlink, the latter one operating on the basis of the channel state information directly provided by the equalization subsystem (EQS), optionally after action of a time prediction and frequency scaling unit (PAC).

8. The system according to claim 4, wherein the DECT base station contains an equalization subsystem (EQS) for uplink and of precompensation (PCS) on the downlink, the former operating on the base of the channel-state information provided by a suitable estimation unit (CES), and the latter operating on the basis of the channel-state information provided by a suitable estimation unit (CES) optionally after action of time prediction and frequency scaling unit (PSS).

* * * * *